C. M. ANDERSEN.
CULTIVATOR.
APPLICATION FILED MAR. 14, 1918.
1,347,926.
Patented July 27, 1920.
2 SHEETS—SHEET 1.
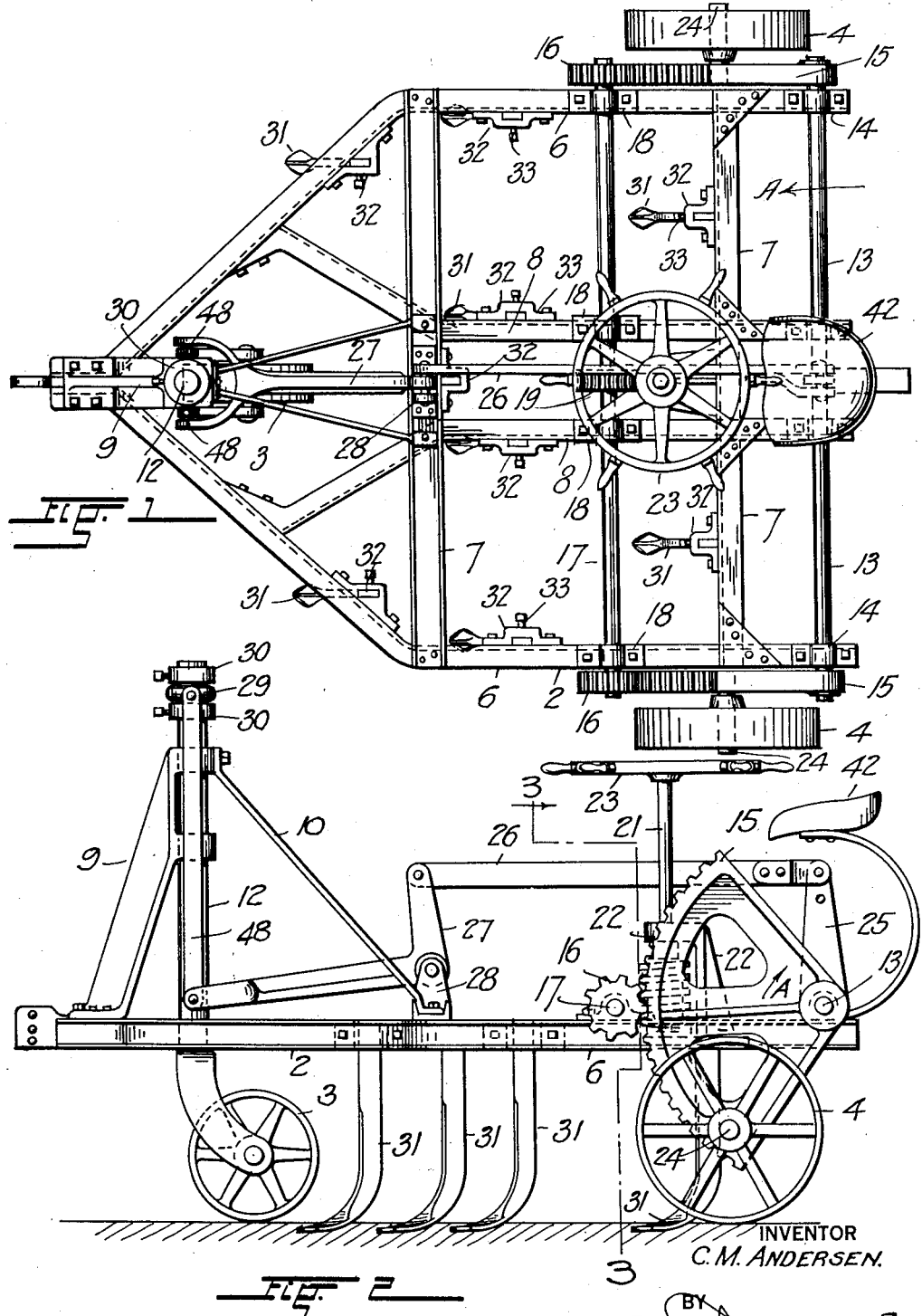
INVENTOR
C. M. ANDERSEN.
ATTORNEY C. M. ANDERSEN.
CULTIVATOR.
APPLICATION FILED MAR. 14, 1918.
1,347,926.
Patented July 27, 1920.
2 SHEETS—SHEET 2.
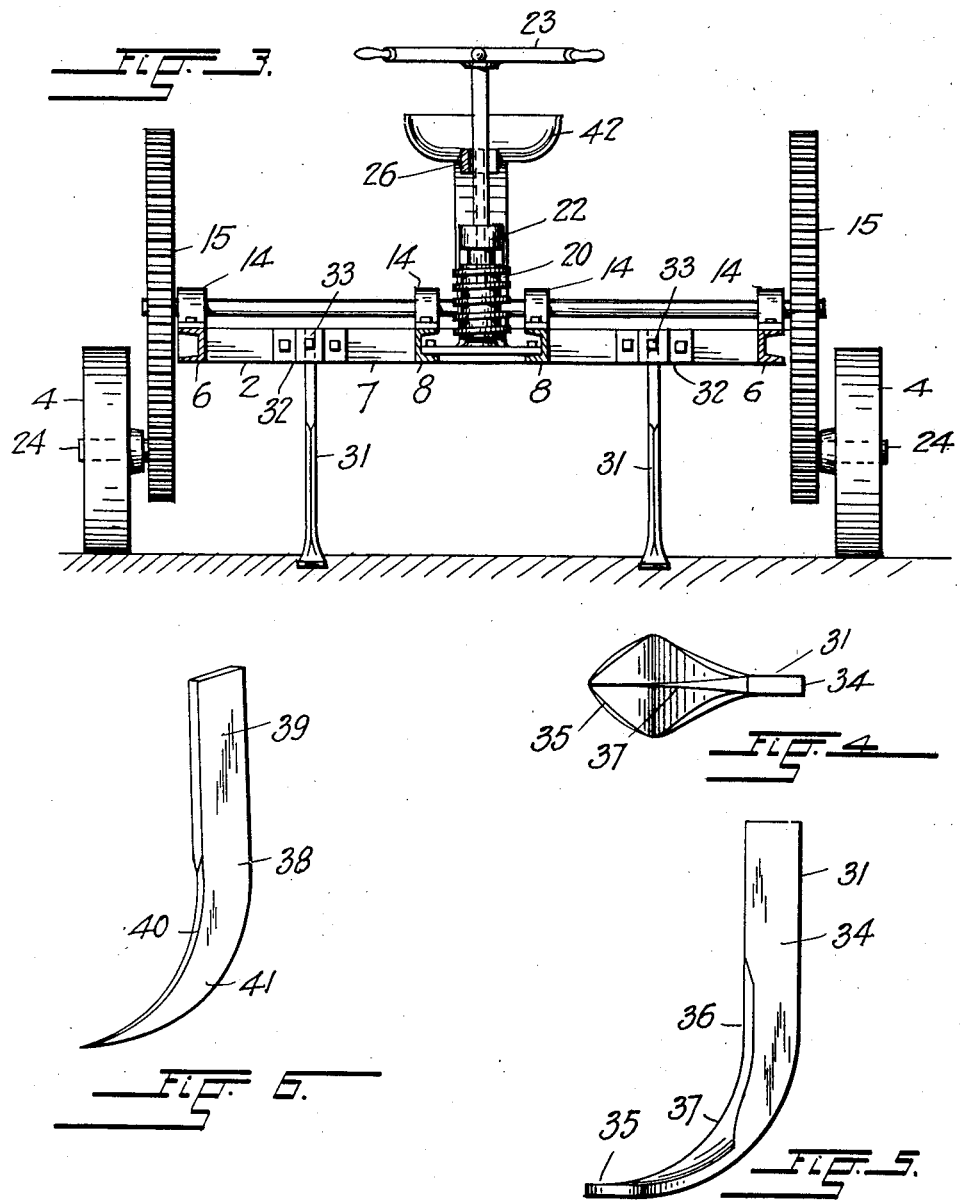
INVENTOR
C. M. ANDERSEN.
ATTORNEY

UNITED STATES PATENT OFFICE.

CHARLES M. ANDERSEN, OF DENVER, COLORADO.

CULTIVATOR.

1,347,926.  Specification of Letters Patent.  Patented July 27, 1920.

Application filed March 14, 1918. Serial No. 222,393.

*To all whom it may concern:*

Be it known that I, CHARLES M. ANDERSEN, a citizen of the United States, residing at Denver, in the county of Denver and State of Colorado, have invented certain new and useful Improvements in Cultivators, of which the following is a specification.

My invention relates to cultivators of the type used for deep tilling of the soil, and its primary object is to provide a cultivator of very simple and durable construction the ground-breaking element of which is readily adjusted to penetrate the soil to the required depth and is with even greater facility drawn out of the ground after the work of tilling the soil is terminated.

Another object of my invention is to provide a machine of the above-described character which will thoroughly cultivate the soil to any desired depth, cut and destroy roots and otherwise place the ground in the proper condition for the cultivation of crops.

With the above objects in view, the cultivating element of the machine consists of a frame mounted for up and downward movement and provided with a plurality of shares in staggered arrangement, which are shaped and constructed according to the nature of the work for which the machine is used, it being understood that the shares of a machine used for tilling a beet-field must necessarily be of a different character than those of a cultivator employed to work an alfalfa field which is filled with roots and other subterranean growths.

The adjustment of the frame to drive the shares into the ground or withdraw them from the same, is accomplished by a hand-operated mechanism which by the peculiar coöperative arrangement of its parts is particularly adapted to produce these results with the minimum of effort and while the machine is in operation.

The above and other objects, all of which will fully appear in the course of the following description, I attain by the construction, arrangement and combinations of parts shown in the accompanying drawings in which like reference characters designate similar parts throughout the several views, and in which, Figure 1 represents a plan view of my improved cultivator, Fig. 2, a side elevation of the same, Fig. 3, a transverse section on the line 3—3, Fig. 2, Figs. 4 and 5, top and side views of one of the shares used in cultivating a beet-field, and Fig. 6, a perspective view of a share used in tilling alfalfa fields.

Referring to the drawings, the reference numeral 2 designates the frame of the cultivating element of the machine which is supported upon a pivoted guide-wheel 3 and two axially alined traction-wheels 4.

The frame is made in skeleton form of structural metal and comprises a pair of side bars 6 which are partially parallel and partially converge toward a central point at the forward end of the machine at which they are joined together for the attachment of the draft gear by which the machine is drawn along the field.

Transverse bars 7 connect the side bars of the frame and support a pair of subsidiary bars 8 which are placed at opposite sides of the longitudinal axis of the machine.

A standard 9 erected at the front end of the same and braced by rearwardly extending rods 10, provides a bearing for a vertical shaft 12 which at its lower forward extremity supports the rotary guide-wheel.

An axle 13 supported in boxes 14 at the rear end of the frame carries at its opposite ends forwardly extending segment gears 15 which mesh with pinions 16 on a driving shaft 17 mounted in boxes 18 on the parallel bars of the frame.

The shaft furthermore carries a worm-wheel 19 which coöperates with a worm 20 at the lower end of an upright shaft 21 mounted in a standard 22 erected upon the middle bars 8 of the frame.

The upright shaft has at its upper end a hand-wheel 23 provided with handles at convenient distances along its rim by which the worm is rotated for the purpose of causing the segment gears to move about their common axis.

The segment gears carry adjacent the lower ends of their toothed rims, outwardly projecting studs 24 upon which the traction wheels 4 of the machine revolve.

In the operation of the machine the segment gears perform the function of levers which when moved about their fulcrums on the frame, raise or lower the latter with relation to their relatively stationary lower ends at which they are pivotally connected with the ground wheels 4.

In order to compel the forward end of the frame to follow the movement thus imparted to the rearward portion of the same, the axle 13 is provided with an upwardly projecting crank-arm 25 which by means of a pitman 26 is operatively connected with the upwardly projecting arm of a bell-crank 27 mounted in a bearing 28 on one of the transverse bars 7 at the forward end of the frame.

The other arm of the bell-crank is forked to straddle the upright shaft 12 of the guide-wheel 3, with which it is connected by means of two parallel bars 48 which extend alongside the shaft and which at their upper ends have a pivotal connection with a ring 29 loosely mounted on the shaft between two collars 30.

It will be seen that when the axle 13 is rotated in either direction to raise or lower the rearward portion of the frame, as hereinbefore explained, the corresponding movement of the bell-crank will cause the forward end of the frame to likewise move in the desired direction, with the result that the entire frame is bodily raised or lowered with but very little effort.

The shares 31 by which the ground is tilled during forward movement of the machine are secured in sockets 32 on the adjustable frame by the use of set-screws 33. As many of these shares may be fastened to the frame as is desirable and they are preferably arranged symmetrically and in staggered order to equalize the working strain at every part of the frame and to thoroughly cultivate each portion of the field over which the machine is propelled.

When the machine is employed to cultivate a sugar-beet field comparatively free of roots, shares of the form shown in Figs. 4 and 5 are productive of the best results.

Each share consists of a flat shank 34 adapted to fit within the sockets of the frame and curved at its lower end into a forwardly projecting, substantially horizontal blade 35 of spear-like form.

The forward edge of the shank is beveled to a chisel edge 36 and is extended into a similarly edged rib 37 which merges into the upper surface of the blade adjacent the point thereof.

The forward edges of the blade are likewise sharpened and a tool thus formed has been found to be particularly adapted for deep tilling a soil comparatively free of roots but of compact formation such as that of the fields used for the cultivation of sugar-beets.

If the machine is used for cultivating alfalfa fields which are filled with roots and other subterranean growths, shares 38 of the form shown in Fig. 6 are substituted for those hereinbefore described.

The share 38 consists of a flat shank 39 which is curved forwardly and terminates into a sharp point. The inner edge of the curved portion 41 of the share at the lower end of the shank is sharpened to a chisel edge as at 40 and in the operation of the machine, cuts and cleaves the roots which remain in the soil after the plants thereof have been harvested.

It will be seen that by turning the axle 13 in the direction of the arrow A in Fig. 1, through the instrumentality of the worm-movement, the frame 2 is gradually lowered and the cultivator shares forced into the ground to any desired depth. This may be accomplished while the machine is moving, by an operator who occupies a spring-supported seat 42 within easy reach of the hand-wheel on the worm-shaft.

In the operation of my improved harvester, the difficulties encountered in withdrawing the shares from the soil in other machines of similar character, are completely eliminated.

The natural resistance to the forward movement of the ground wheels 4 imparts to the levers by which they are connected with the frame, a tendency to assume a vertical position, and to thereby raise the frame and the therewith connected shares which normally extend into the ground.

This movement of the levers is prevented only by the frictional resistance of the gearing with which they are connected and it follows that when it is desired to withdraw the shares from the ground, a comparatively slight pressure upon the hand-wheel 23 in a direction opposite to that in which it was moved to lower the frame, will while the machine is in motion, be sufficient to lift the frame until the shares are clear above the surface of the ground.

The shares herein described, have been made subjects of applications for patent separate from the present one and I desire it understood that while I have shown and described the other parts of my improved harvester in the best form at present known to me, variations in their construction and arrangement may be resorted to within the spirit of my invention as defined in the following claims:

1. A cultivator of the class described including a frame, a transverse shaft extending across the frame at the back thereof, toothed segments connected to the ends of the shaft and located at opposite sides of the frame exteriorly thereof and provided with spindles, traction wheels mounted on the spindles, a front centrally arranged guide wheel, a vertically movable shaft carrying the guide wheel, a lever connection for connecting the vertically movable shaft with the transverse shaft for simultaneously raising or lowering the traction wheels when the transverse shaft is partially rotated, a drive shaft having pinions meshing with the toothed segments, an operating shaft, and gearing for connecting the operating shaft with the drive shaft.

2. A cultivator of the class described including a frame, a transverse shaft extending across the frame at the back thereof, toothed segments connected with the said shaft and located at opposite sides of the frame exteriorly thereof and provided with spindles, traction wheels mounted on the spindles, a centrally arranged front guide wheel, a vertically movable shaft carrying the guide wheel and located at the front of the frame, a lever connection between the vertically movable shaft and the transverse shaft for causing the guide wheel and the traction wheels to be simultaneously raised or lowered when the transverse shaft is partially rotated, a drive shaft extending across the frame and provided at an intermediate point with a worm wheel and having pinions at its ends to mesh with the toothed segments, and an operating shaft having a worm meshing with the worm wheel.

3. A cultivator of the character described including a frame, a transverse shaft extending across the frame at the back thereof and provided with a central upwardly projecting arm, a pair of toothed segments mounted on the shaft exteriorly of the frame and extending forwardly from the shaft at opposite sides of the same and provided at the front with toothed faces and having spindles extending laterally from the segments at the lower ends of the said toothed faces, traction wheels mounted on the spindles for supporting the rear of the frame, a front centrally arranged guide wheel, a vertically movable shaft carrying the guide wheel, a centrally arranged bell crank lever mounted on the frame and having forwardly and upwardly extending arms, links connecting the said arms with the vertically movable shaft and the arm of the transverse shaft, a drive shaft extending across the frame at a point between the vertically movable shaft and the said transverse shaft and provided between its ends with a worm central wheel and having pinions at its ends meshing with the toothed segments, and a central operating shaft provided with a worm meshing with the worm wheel and adapted to actuate the same for simultaneously raising and lowering the guide and traction wheels.

4. A cultivator of the class described, including a frame, a transverse shaft extending across the frame, toothed segments mounted on the shaft at the ends thereof and arranged exteriorly of the frame and having toothed faces extending from the top to the bottom of the segments, the latter being also provided with spindles extending laterally from the segments in the lower ends of the toothed faces, traction wheels mounted on the spindles and carried by the segments, a drive shaft extending across the frame and provided with pinions meshing with the tooth of the segments and operating means for rotating the drive shaft.

In testimony whereof I have affixed my signature in presence of two witnesses.

CHARLES M. ANDERSEN.

Witnesses:
G. J. ROLLANDET,
L. RHOADES.